United States Patent Office 3,274,104
Patented Sept. 20, 1966

3,274,104
SOLVENT EXTRACTION PROCESS
Charles E. Hamilton, Midland, Mich., assignor to The Dow Chemical Company, Midland, Mich., a corporation of Delaware
No Drawing. Filed May 1, 1963, Ser. No. 277,144
11 Claims. (Cl. 210—39)

The present invention relates to the general field of extraction with solvents. In particular, the invention concerns the employment of certain organic solvents to elute adsorbed organic materials from carbon substrates.

In the extraction art, organic matter, especially organic matter highly dispersed in aqueous streams, can be extracted from such streams by contacting them with a carbon substrate, e.g., by flowing them through a bed of activated charcoal. The charcoal bed adsorbs the organic material thereby extracting it from the water. Once the organic material begins to appear in the effluent from the bed, it becomes necessary to reactivate or regenerate the charcoal for further extraction. This can be accomplished by drying the charcoal and heating it at an elevated temperature under controlled atmosphere conditions. The heating operation destroys the adsorbed organic materials.

Sometimes, however, it is desirable to recover the adsorbed organic materials, which may be desired for analytical or other purposes, while at the same time reactivating the bed for subsequent extraction operations. To accomplish these ends it is possible to elute the adsorbed organic materials from the carbon substrate.

An instance of the latter operation is involved in the method employed by the U.S. Public Health Service to analyze water for various organic pollutants. In rivers, organic pollutants may be present in concentrations of as little as a few parts per billion. To concentrate such disperse organic matter to a sample size adequate for analysis, large volumes of water to be analyzed are passed through a bed of activated charcoal. Subsequently, the loaded charcoal is dried at ambient room temperatures and eluted in sequence with chloroform and methanol. Each of these organic solvents has a high solvency for a wide variety of organic materials soluble or dispersible in aqueous streams. To carry out continuous elution of the charcoal with a small amount of the solvent, it is standard practice to continuously distill the eluant and recycle the condensate through the charcoal.

While the recovery of the organic materials adsorbed on charcoal is substantial with such solvents as methanol and chloroform, it would be desirable, and it is an object of the present invention, to provide a solvent system capable of achieving improved recovery of organic materials adsorbed on charcoal. A further object is to provide an efficient, single phase, solvent system which avoids the need for sequential treatment with two or more solvents.

A still further object is to provide a solvent system with a high tolerance for water. Such a solvent can be used to elute organic matter from wet charcoal. When chloroform and methanol are employed as the eluting solvents, it is necessary for good results to first dry the charcoal. Such drying can result in the loss of the more volatile components in the adsorbed organic matter. Manifestly, it is desirable to avoid both the need to dry the charcoal prior to elution and the consequential loss of volatile matter. These and other objects and benefits will become apparent hereinafter as the invention is more fully described.

The present discovery comprehends an improvement in the basic process of eluting adsorbed organic materials from a carbon substrate with an organic solvent system. The improvement particularly comprises employing as the organic solvent system a mixture of one part of

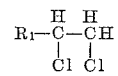

with from about 0.2 to about 2 parts of $R_2OH$. In the above formulas $R_1$ is selected from the group consisting of hydrogen and methyl and $R_2$ is selected from the group consisting of methyl and 2-propyl groups. Particularly, the solvent mixtures employed are either 1,2-propylenedichloride or ethylenedichloride in admixture with either methanol or isopropanol. Such solvent systems provide highly efficacious eluants for organic materials adsorbed on charcoal.

Unique advantages are achieved in accordance with the invention when azeotropic combinations of the foregoing solvents are employed. Any specified combination of the halogenated solvents with the alcohols will produce, when adjusted to the proper relative portions, a constant boiling azeotrope. With the azeotropes, the condensate has the same boiling point as the solvent system, and thus the solvent system is conveniently distilled from the eluate and recycled through the charcoal bed, thereby keeping the amount of eluant required at a minimum.

A particularly superior and efficient solvent system consists of the azeotrope of 1,2-propylenedichloride and methanol. This solvent system is characterized by an exceptional capability to elute from charcoal such organic materials as phenols and alkylbenzene sulfonates which are strongly adsorbed on activated charcoal. A further advantage obtained from the use of this azeotrope stems from the fact that it consists of nearly equal proportions of its ingredients. Thus, the azeotrope possesses an optimum combination of the solvency characteristics of its individual constituents.

Generally, the solvent systems of the invention are utilized to elute organic materials from carbon substrates which readily adsorb organic materials from fluid media. Almost all organic materials dispersible in fluid media can be adsorbed to some extent on a carbon substrate such as activated charcoal. Organic materials are, of course, subject to varying degrees of retention on the carbon substrate and occasionally an organic material more strongly adsorbed by the carbon may displace a material less strongly held. In any event, however, the present invention does not depend upon, or concern, the relative adsorption of organic materials on carbon but, rather, is directed to elution of those organic materials that are adsorbed on carbon substrates.

Usually, the carbon substrate eluted in accordance with the invention will be an activated wood charcoal. Such materials are conveniently used to extract organic phases from aqueous streams by adsorption. Other carbon substrates than can be used include activated forms of bone, blood, and vegetable charcoals. Also various granulated forms of activated lampblack and similar thermal carbons can be used. In addition to those organic materials which may become adsorbed on the charcoal, many aqueous streams will contain some proportion of suspended inorganic solids. For best results, the total amount of inorganic suspended solids in the aqueous stream being extracted should not be permitted to exceed about 30 parts per million. While such suspended solids do not ordinarily interfere with effective elution of the adsorbed organic materials, the solids retained within the interstices of the carbon prevent complete regeneration of the activated charcoal. This is due to the fact that most of the inorganic solids are not soluble in the solvent systems employed to elute the adsorbed organic materials and thus they are retained in the carbon substrate. Such retained inorganic solids have a tendency to reduce the effective adsorbing surface and to plug passages for liquid flow.

The employment of activated chracoal extraction followed by elution in accordance with the invention is most efficacious in its application to the purification of waste streams and the recovery of materials from polluted waters for analysis.

In a typical operation for the purification of a waste stream, beds of activated charcoal are placed within several vertical contacting columns, e.g., at least about 4 columns. At any one time at least 2 columns are on stream in series. That is, the waste stream to be purified is being charged to the bottom of one column and the effluent from this column is pumped to the bottom of a second column. While the columns on stream are extracting organics from the waste stream, the remaining columns are being eluted and regenerated (reactivated) in accordance with a process of this invention with a solvent mixture, preferably an azeotrope, as specified above.

The amount of the solvent system employed to accomplish elution from the fixed bed charcoal is sufficient to readily contain and maintain in a dissolved condition adsorbed extract from at least one loaded charcoal column. During regeneration, one of the specified solvent systems is passed through the loaded charcoal beds. The solvent system is continuously recovered from the eluate by distillation and recycled through the charcoal bed. This elution and redistillation operation is continued until the eluate is substantially free of foreign organic materials. With proper process planning, the column being regenerated should be ready to go back on stream about the time the first of the series of extracting charcoal columns is substantially loaded with adsorbed organics. At this point, feeding of the aqueous stream is diverted to the second column of the series being loaded and the effluent from this column is directed to a newly reactivated column. Thus, one extraction and regeneration cycle is completed and a second is begun.

If analysis of the extract from the aqueous stream is the primary purpose for carrying out the extraction and elution processes, the eluate may be distilled and fractionated under reduced pressures. This operation separates the solvents from the extracted organic materials. At this point the extract may be analyzed by infrared spectroscopy, or it may be further separated into several fractions of organic materials classified according to boiling point ranges. These fractions can then be analyzed by any convenient procedure. Whenever extract residues consist of relatively few components or are comprised of a major proportion of a few components, fractional distillation permits recovery and purification of various individual constituents for identification or reuse, as may be desired.

The following examples are illustrative of the various solvent systems contemplated herein as well as their application to the recovery of organic materials adsorbed on activated carbon from aqueous streams. While only aqueous streams are illustrated, it should be recognized that initial adsorption of the organic materials may be from gaseous fluids and the organic materials adsorbed may exist in their natural state as solids, liquids or gases. The only requirement of the application for the present invention to their recovery from fluid streams is that they be adsorbed on activated charcoal or similar activated carbons.

*Example 1*

The following experiment demonstrates the recovery efficiencies of various azeotropic solvent mixtures according to the invention on charcoal loaded with known amounts of specific organic materials. The organic materials loaded on the charcoal in this experiment were chosen because of their strong retention on charcoal. Thus, demonstration that the solvent mixtures of the invention achieve efficient removal of such materials is substantial evidence that organic materials having equal or lesser affinity for charcoal are subject to efficient elution by the solvent mixture.

Activated charcoal having a particle size small enough to pass a 10 mesh screen and be retained on a 30 mesh screen of the Tyler series was placed in vertical glass columns ⅝ inch in diameter and 2 feet in height. Glasswool plugs were inserted in both ends of the columns. A known solution of the organic material to be loaded on the activated carbon was then passed up through the charcoal bed until the effluent from the column evidenced the organic material. When the material being loaded on the charcoal appeared in the effluent, application of the solution was stopped. The amount of the organic material loaded in the charcoal bed was computed by multiplying the total volume fed by the concentration of the organic material in the feed solution.

Among materials loaded on the charcoal were various phenols. The presence and amount of these materials in the effluent from the charcoal was determined by the standard bromate-bromide titration technique as reported in "Standard Methods for Examination of Water and Waste Water," 11th Ed., 1960, pp. 406–407. One material, 2-secondary butyl-4,6-dinitrophenol, was detected spectrophotometrically by comparison with a standard concentration curve. Another material evaluated was a standard alkylbenzene sulfonate. This was detected by an analytical technique described on pp. 246–248 of the aforementioned standard reference.

Once loaded, the charcoal was removed from the extraction column and placed in a Soxhlet extractor. The extractor was connected in series with the distillate return of a distillation column and the underflow of the extractor was discharged to the still of the distillation column. A solvent system of the invention was then introduced into the still and heated continuously for 2 hours during which period all distillate was returned to the still after trickling through the loaded carbon in the Soxhlet extractor. A this point, the still bottoms were removed and solvents permitted to evaporate at room temperature. The residue, consisting almost exclusively of the organic material originally loaded on the activated charcoal bed was analyzed by the appropriate method. With this analytical data and the original quantity loaded on the bed, the percentage recovery for that particular compound was computed.

This procedure was repeated for several solvent mixtures of the invention inclusive of 1,2-propylene-dichloride and methanol (PDC-MeOH), ethylenedichloride and methanol (EDC-MeOH), 1,2-propylenedichloride and isopropanol (PDC-IPrOH), ethylenedichloride and isopropanol (EDC-IPrOH), each of the foregoing mixtures being employed as an azeotrope. Also, further experiments conducted in a similar manner gave results upon which a comparison may be made with the sequential chloroform and methanol elution technique employed by the U.S. Public Health Service in its analysis of aqueous streams for organic pollutants.

The organic materials loaded on the activated charcoal and the percentage of recovery with solvent systems in accordance with the present invention are set forth in the following table.

TABLE 1

| Materials Loaded → | Amount Recovered (Percent) | | | | |
|---|---|---|---|---|---|
| | Phenol | NaDNOSBP [1] | DNOSBP [2] | DCP [3] | ABS [4] |
| Solvent System: | | | | | |
| PDC-MeOH | [5] 95.6 | 93.2 | 91.0 | [5] 95.4 | [5] 84 |
| EDC-MeOH | [5] 87.3 | | 76.6 | | [5] 77.4 |
| PDC-IPrOH | 76.5 | | | [5] 100 | 88.4 |
| EDC-IPrOH | [5] 87 | | | | |
| CHCl³ | 51 | 19.2 | | 70.8 | [5] 74.2 |
| MeOH | 16 | 50.3 | | 3.7 | [5] 1.7 |
| Total (CHCl³+ MeOH) | 67 | 69.5 | | 74.5 | 75.9 |

[1] Sodium salt of 2-sec. butyl-4,6-dinitrophenate.
[2] 2-sec. butyl-4,6-dinitrophenol.
[3] A mixture of 98 percent 2,4-dichlorophenol and 2 percent 2,6-dichlorophenol.
[4] A sodium alkylbenzene sulfonate adopted as a standard ABS in 1959 by the Association of American Soap and Glycerine Producers, Inc.
[5] Averages for several runs.

*Example 2*

In this experiment the efficiency of phenol recovery from charcoal was determined for two successive regenerations of a charcoal bed. The charcoal bed was prepared and loaded at in the above experiment with phenol. It was then eluted with an azeotropic mixture of 1,2-propylenedichloride and methanol. The eluted and regenerated charcoal was reloaded with phenol and eluted with the same solvent system two more times.

The initial recovery of phenol and the recovery after two successive regenerations of the charcoal, were respectively 95 percent, 90.8 percent and 90.1 percent of the total phenol loaded prior to each successive run. It was also observed that the total amount of phenol loaded in each of these runs was nearly equal to that loaded on the freshly activated charcoal. Thus, not only are the unique solvents of the invention efficient eluants for organic materials adsorbed on charcoal but they also provide an efficient technique for regeneration of such charcoal.

*Example 3*

In the foregoing examples the only mixtures of solvents employed were the azeotropes of the particular mixtures. This was done for convenience. However, the invention is not limited to azeotropic mixtures. The following example illustrates a range of proportions over which the solvent mixtures produce efficient elution and regeneration of charcoal having organic materials adsorbed thereon.

A quantity of activated wood charcoal was uniformly loaded to near saturation of its adsorption capacity with a known amount of phenol. Seven one gram samples of the loaded charcoal were eluted with 20 cubic centimeters of each of six different mixtures of methanol (MeOH) and 1,2-propylenedichloride (PDC). Likewise, two additional one gram samples were extracted, respectively, with 20 cc. each of methanol and 1,2-propylenedichloride.

Upon completing elution of the loaded charcoal with the various solvent mixtures and individual solvents, the solutions were filtered and analyzed in a vapor phase chromatography unit (Model 1609 by the F. & M. Scientific Company). In this unit, the solvent-extract solutions were heated at about 190° C. and the resulting vapors passed, along with nitrogen and helium carrier gases, through a vertical column two feet high filled with silicone rubber particles. The gaseous effluent from the column was passed through a hydrogen flame detector. The experimental solvent-extract solutions were compared against standard solutions containing from 0.010 to 0.025 gram of phenol in 20 cc. of the azeotropic mixture of methanol and 1,2-propylenedichloride.

The eluant solvent composition, the relative peak height obtained with the hydrogen flame detector (this is proportional to the concentration of extracted phenol), and the corresponding grams of extracted or recovered phenol per 20 cc. of solvent are reported in the following table. It is to be noted that the 53/47 mixture of methanol/1,2-propylenedichloride is the azeotrope of these solvents.

TABLE 2

| Solvent Composition MeOH/PDC | Peak Height | Recovered Phenol (gms./20 cc.) |
|---|---|---|
| 0/100 | .58 | .012 |
| 10/90 | 1.54 | .015 |
| 20/80 | 2.50 | .018 |
| 40/60 | 2.54 | .018 |
| 53/47 | 2.70 | .019 |
| 60/40 | 2.30 | .017 |
| 80/20 | 1.62 | .014 |
| 100/0 | .5 | .009 |

*Example 4*

To illustrate the application of the present invention to the purification of a waste stream, two identical columns were filled with equal weights of an activated wood charcoal. The columns were connected in parallel for liquid flow. A previously filtered chemical processing waste stream of known COD (chemical oxygen demand) was fed to the columns and the COD in the effluent from the columns was monitored. Loading of the columns with the organic materials conttained in the filtrate was continued until the COD of the effluent from each charcoal column reached 30 parts per million. COD was measured according to the procedure set forth in "Standard Methods for Examination of Water and Waste Water," 11th Ed., 1960, pp. 399–401.

The loaded charcoal was removed from each of the columns and air dried for five days. The dried charcoal from one of the columns was eluted with 4 liters of a 1,2-propylenedichloride-methanol azeotrope in a Soxhlet extractor integrated within a closed distillation system for 48 hours. This resulted in the contacting of the loaded charcoal with 30 liters of the solvent system. The charcoal taken from the second column was sequentially eluted in a like manner for 48 hours with 4 liters each of chloroform and methanol. The percentages of the COD recovered, based on theoretical loadings, by the first and second elution methods were 44.7 and 33.2 percent, respectively.

To determine the general nature of organic materials contained in the above waste stream, a methylene chloride extract of the waste stream was analyzed by means of infrared analysis and found to contain isopropylbenzene, benzoic acid, arlyoxyacids, hydroxyaryl acids such as salicylic acid, silicones, dibutylphthalate, diethylbenzene and dinitro sec. butylphenol. Infrared analysis of a methanol extract of such waste indicated the presence of polyoxyalkylene glycols, ethers of the polyoxyalkylene glycols, esters and ethers of polyoxyalkylene glycols, hydroxyalkyl acids and aliphatic hydrocarbons. Other materials revealed by mass spectroscopy included tolyl ether, pentachlorophenol, aliphatic alcohols, ethers and esters, e.g., mono- and dipropylene glycol and mono- and diesters of propylene glycol.

In a manner similar to the foregoing example, azeotropic mixtures of ethylene dichloride and methanol, 1,2-propylenedichloride and isopropanol and ethylenedichloride and isopropanol are substituted for the 1,2-propylenedichloride-methanol azeotrope to achieve comparable results.

What is claimed is:
1. The method which comprises eluting organic materials adsorbed on a carbon substrate with an organic solvent system comprising a solvent admixture of one part of

$$R_1-\underset{Cl}{\underset{|}{C}}-\underset{Cl}{\underset{|}{C}}H$$

wherein $R_1$ is selected from the group consisting of hydrogen and methyl, with from 0.2 to 2 parts of $R_2OH$ wherein $R_2$ is selected from the group consisting of methyl and 2-propyl.

2. A method as in claim 1 wherein the solvent admixture is the azeotrope of 1,2-propylenedichloride and methanol.

3. A method as in claim 1 wherein the solvent admixture is the azeotrope of 1,2-propylenedichloride and isopropanol.

4. A method as in claim 1 wherein the solvent admixture is the azeotrope of ethylenedichloride and methanol.

5. A method as in claim 1 wherein the solvent admixture is the azeotrope of ethylenedichloride and isopropanol.

6. A method for regenerating charcoal having organic materials adsorbed thereon, which method comprises passing through said charcoal to be regenerated a solvent admixture of one part of $$R_1-\underset{Cl}{\underset{|}{C}}-\underset{Cl}{\underset{|}{C}}H$$

wherein $R_1$ is selected from the group consisting of hydrogen and methyl with from 0.2 to 2 parts of $R_2OH$ wherein $R_2$ is selected from the group consisting of methyl and 2-propyl groups.

7. A method which comprises passing an aqueous stream containing organic pollutants through a bed of activated charcoal to load the bed with adsorbed organic pollutants and thereafter eluting the wet charcoal bed with a solvent admixture of one part of $$R_1-\underset{Cl}{\underset{|}{C}}-\underset{Cl}{\underset{|}{C}}H$$

wherein $R_1$ is selected from the group consisting of hydrogen and methyl with from 0.2 to 2 parts of $R_2OH$ wherein $R_2$ is selected from the group consisting of methyl and 2-propyl groups.

8. A method as in claim 7 wherein the solvent admixture is the azeotrope of 1,2-propylenedichloride and methanol.

9. A method as in claim 7 wherein the solvent admixture is the azeotrope of 1,2-propylenedichloride and isopropanol.

10. A method as in claim 7 wherein the solvent admixture is the azeotrope of ethylenedichloride and isopropanol.

11. A method as in claim 7 wherein the solvent admixture is the azeotrope of ethylenedichloride and methanol.

References Cited by the Examiner

UNITED STATES PATENTS 1,982,828  12/1934  Pew et al. _____ 252—414
2,128,931  9/1938   Ferris et al. _____ 252—414

MORRIS O. WOULK, *Primary Examiner.*

E. G. WHITBY, *Assistant Examiner.*